Nov. 5, 1963  B. PETROWSKY  3,109,765
MEANS FOR AND METHOD OF REPAIRING RUPTURED SURFACES
Filed July 27, 1960
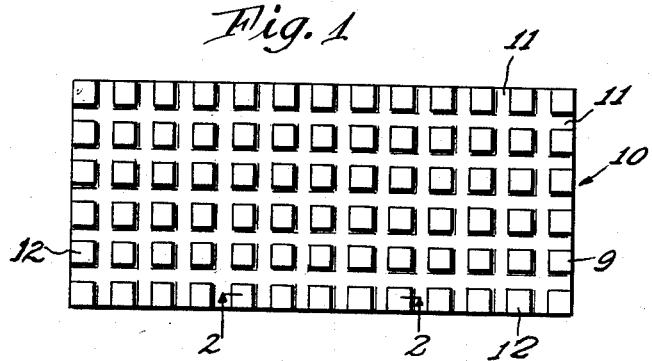
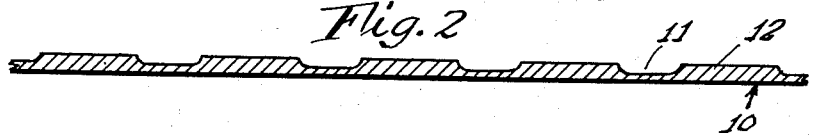
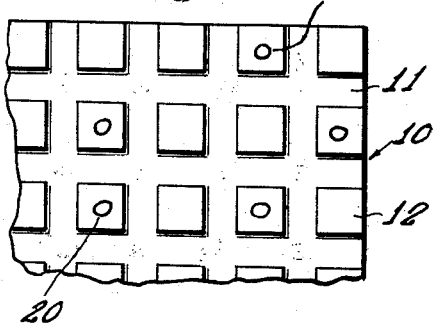
INVENTOR.
Benjamin Petrowsky
BY
March and Curtiss
ATTORNEYS

United States Patent Office 3,109,765
Patented Nov. 5, 1963

3,109,765
MEANS FOR AND METHOD OF REPAIRING RUPTURED SURFACES
Benjamin Petrowsky, 8020 Bay Parkway, Brooklyn, N.Y.
Filed July 27, 1960, Ser. No. 45,760
3 Claims. (Cl. 161—39)

This invention relates to the repair of ruptured sheet material of a character which is relatively hard, stiff and of solid or non-porous texture, and more particularly it relates to the repair of ruptured parts such as automobile bodies, fenders, and the like, made of sheet metal, or things made of other material such as synthetic resins or other hard plastics, although at the present time it finds its greatest application in the field of sheet metal repair and will be referred to hereinafter specifically in connection with sheet metal.

Heretofore, in the field of automobile body repair, when the sheet metal of the body is ruptured or when it is damaged to an extent which makes it essential to remove and replace the damaged portion, it is necessary to utilize a backing to cover the ruptured area and fill in the rupture closed by the backing. This type of repair has been made in different ways using various materials, usually flowable metal alloys or adhesive hard-plastic materials, whereby the rupture is filled in and the excess material ground away until a smooth surface even with the surface of the ruptured material is obtained. However, when a solid metal backing plate is used to cover the rupture, it is the usual practice to drill holes through the sheet material to the backing plate. This takes time, which increases the expense and, of course, it enlarges the size of the repaired area, requires the use of additional repair material, and increases the amount of grinding or other finishing of the repaired surface.

According to the present invention these and other undesirable practices are obviated, and to this end, in its broader aspects, the invention contemplates a novel means for and method of repairing a rupture in materials of the character of sheet metal or hard plastic wherein a backing plate is used which is formed in one face with a plurality of grooves which, when the plate is positioned to cover the rupture, provide passages extending between the face of the plate and the marginal area of the material around the rupture, whereby an adhesive plastic or solder may be poured or forced into the rupture to flow into and fill the grooves and, when set, adhesively secure the plate to the ruptured material.

More specifically, the invention contemplates a backing plate of novel and unique form and design which is made of a dead-soft metal, metal alloy or other suitable material to render it readily conformable to the contour of the surface with which it is to be used as a backing. The outer face of the backing plate is formed with grooves of substantial width and a depth which is about one-half the thickness of the plate. The grooves intersect and each groove extends from one edge of the plate to another edge to form a continuous passage. Between the intersections lands are created, and the relation of the dimensions of the grooves to those of the lands is such that the total area of the plane surfaces of the lands is equal to at least one-half of the total area of the face of the plate, thus providing for a substantial contact with the material to be repaired.

In the accompanying drawings, the invention has been shown merely by way of example and in preferred form and obviously many variations and modifications may be made therein which will still be comprised within its spirit. It is to be understood, therefore, that the invention is not limited to any specific form or embodiment, except insofar as such limitations are specified in the appended claims.

Referring to the drawings:
FIG. 1 is a plan view of the grooved backing plate;
FIG. 2 is an enlarged partial section, taken on the line 2—2 of FIG. 1 and looking in the direction of the arrows;
FIG. 3 is a sectional view like FIGURE 2, showing the backing plate in use; and
FIG. 4 is a fragmentary plan view of a modified form of the backing plate shown in FIGS. 1 to 3.

As shown in FIGS. 1 and 2, the backing plate or blank 10 is a relatively thin structure, rectangular in shape and, as already stated, is preferably made of a dead-soft metal or metal alloy adapted to conform readily to the shape or contour of the ruptured surface for which it is to form a backing. The outer face of the plate or blank 10 is formed with a plurality of grooves 11, which are arranged to extend crosswise and lengthwise of the plate 10, thereby intersecting one another and forming lands 12 between the intersections. As will be observed, the more clearly in FIG. 2, the grooves 11 are of substantial width and their depth is about equal to one-half the thickness of the plate 10. The flat or plane surfaces 9 of the lands 12 are considerably wider than the grooves 11, and in practice the combined surface area of the lands 12 is at least equal to one-half the area of the face of the plate 10. This enables the lands 12 to present broad areas for engagement with the material to be repaired and assists in the conformation of the plate 10 to the contour of the surface with which it engages.

In FIG. 3 there is shown a segment of a sheet of metal 13 which has been ruptured, the rupture being outlined by the jagged edges 14. A backing plate 10 large enough to more than cover the ruptured area is arranged in engagement with the sheet of metal 13 around the rupture, as at 15, the surface 16 having been cleaned of all dirt, oil, rust and other foreign matter and, if necessary, filed, ground, etc. and/or fluxed, depending upon how the repair is to be made, all as is well understood by those skilled in the art. The plate 10 has also been shaped to the contour of the metal 13 in the directions of the arrows in FIG. 3, as well as in the central area 17 where it follows the contour of the metal 13 in directions at right angles to the said arrows.

The plate 10 may be held in backing engagement with the metal 13 by any suitable means while the repair is being made. As shown in the drawings, the repair is being made with a synthetic resin composition 18 which adheres to metal when it has hardened or set. It will be remembered that the grooves 11 extend from one edge of the plate 10 to another edge thereof and, however, in the marginal areas 15 around the rupture the grooves 11 extend between the lands 12. Thus when the adhesive composition 18 is poured or forced into the rupture some of it flows laterally therefrom under the metal 13 to fill the grooves 11 and, upon setting, cements the plate 10 to the sheet of metal 13. After the composition 18 has set it is then smoothed off in the area of the rupture to form a surface 19 which is even with the surface of the sheet 13.

In modified form, a plate 10 is shown in FIG. 4 wherein apertures 20 are formed in the lands 12. The apertures 20 extend through the opposite face of the plate and provide a gripping surface for the insertion of tools to manipulate the plate as desired. Thus, in utilizing this modification, the plate may be preformed and then adjusted after its insertion in place.

It will be understood that the lands and grooves may be provided, if desired, on both sides of the plate or on any portion thereof, with substantially similar effect under different types of repair. Further, the word "ruptured" as used herein contemplates rupturing occurring through collision or the removal of the metal in effecting the repair.

As stated heretofore, the present invention is not limited with respect to the material of which the plate is formed or the material with which it is used, except that it must be suitable for its intended purpose in a particular environment and it must be bondable by the particular repair material employed. Thus, to repeat, the present invention is not limited to any particular form or embodiment, or in its mode of application, except as limitations may be specified in the appended claims.

What I claim is:

1. In combination, a sheet of metallic material including a back surface and a front surface, said sheet having a rupture extending entirely through the same, a blank of relatively stiff hard sheet material having a solid texture, said blank being adapted to be readily adhered to said back surface of said sheet, said blank having an outer surface formed with a plurality of intersecting grooves therein, there being land portions of said outer surface between said grooves, each of said land portions having a thickness in cross section equal to the maximum thickness of said blank whereby the thickness of said blank within said grooves is substantially less than the maximum thickness of said blank, said blank being placed behind said sheet in overlapping relation to said rupture, there being marginal portions of said outer surface of said blank facing like portions of said back surface of said sheet laterally outwardly of said rupture in all directions, said lands of said outer surface of said marginal portions of said blank abutting corresponding portions of said back surface of said sheet outwardly of said rupture, that portion of said outer surface of said blank lying within said rupture being entirely covered with a hardenable plastic composition in an amount to fill said rupture to at least the level of said front surface of said sheet, and said plastic composition filling said grooves of said marginal portions of said outer surface of said blank and upon hardening forming a mechanical bond between said marginal portions and corresponding portions of said back surface of said sheet.

2. In a method of repairing a rupture in a sheet of material of a character which is relatively hard, stiff and of solid texture, the steps of preparing one face of the material around the rupture to provide a clean surface, placing over said rupture and in contact with said clean surface a plate the contacting face of which is formed with grooves therein which extend from within the area of the rupture beyond the edge thereof into the area of the clean surface, flowing plastic adhesive through the rupture onto said plate in a quantity whereby it flows into and fills said grooves, and allowing the adhesive in the grooves to set to secure said plate to said clean surface.

3. In a method of repairing a rupture in a sheet of material of a character which is relatively hard, stiff and of solid texture, the steps of preparing one face of the material around the rupture to provide a clean surface, placing over said rupture and in contact with said clean surface a plate the contacting face of which is formed with grooves therein which extend from within the area of the rupture beyond the edges thereof into the area of the clean surface, flowing a plastic adhesive filling composition through said rupture onto said plate in a quantity whereby it fills the rupture and the grooves, and allowing the adhesive filler to set to secure said plate to said clean surface and to fill the opening created by the rupture in said sheet of material.

References Cited in the file of this patent

UNITED STATES PATENTS

| | | |
|---|---|---|
| 2,337,555 | Hosking | Dec. 28, 1943 |
| 2,486,669 | Nassimbene | Nov. 1, 1949 |
| 2,606,855 | Jenkins | Aug. 12, 1952 |
| 2,688,581 | Stubbs | Sept. 7, 1954 |
| 2,690,986 | Vollertsen | Oct. 5, 1954 |
| 2,795,523 | Cobb et al. | June 11, 1957 |
| 2,830,001 | Barnes et al. | Apr. 8, 1958 |